Figure 1:
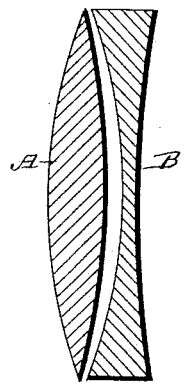

(No Model.)

C. S. HASTINGS.
TELESCOPE OBJECTIVE.

No. 415,040.　　　　　　　Patented Nov. 12, 1889.

Witnesses
Thomas Durant
F. S. Smith

Inventor
Charles S. Hastings
By his Attorneys
Church & Church

UNITED STATES PATENT OFFICE.

CHARLES S. HASTINGS, OF NEW HAVEN, CONNECTICUT.

TELESCOPE-OBJECTIVE.

SPECIFICATION forming part of Letters Patent No. 415,040, dated November 12, 1889.

Application filed April 27, 1889. Serial No. 308,771. (No model.)

*To all whom it may concern:*

Be it known that I, CHARLES S. HASTINGS, of New Haven, in the county of New Haven and State of Connecticut, have invented certain new and useful Improvements in Telescope-Objectives; and I do hereby declare the following to be a full, clear, and exact description of the same, reference being had to the accompanying drawings, forming a part of this specification, and to the figures and letters of reference marked thereon.

My present invention relates particularly to improvements in the construction or composition of that portion of a telescope known as the "objective" or "object-glass," by which I mean the lens or combination of lenses through which the light enters in passing from an object toward the eye of the observer; and it has for its principal object to eliminate or in a very great degree obviate the defect known technically as the "secondary spectrum" or "outstanding color due to irrationality of dispersive powers," or which may be called with greater accuracy "secondary chromatic aberration," which defect is an incident to the construction and present in a great degree in all objectives heretofore made or used.

To this end my said invention consists in the means hereinafter described and claimed for suppressing or eliminating these defects.

In the accompanying drawings, Figures 1, 2, 3, and 4 represent in section various conventional forms and combinations of lenses constituting achromatic objectives. Fig. 5 is a sectional view of a pair of prisms, and is designed to illustrate an achromatic combination.

Similar letters of reference in the several figures indicate the same parts.

In order to clearly define and elucidate the character of my invention, it may be well to consider succinctly the history of the art of telescope-making, premising that as the present invention does not relate to reflecting-telescopes that type of instrument will not be further referred to.

The refracting-telescope as invented in the early part of the seventeenth century consisted of a single object-lens, the function of which is to form an image of a distant object, which image could be examined either by the unaided eye or by the eye aided by a lens or system of lenses denominated the "eye-piece" or "ocular." One modification of this construction, and indeed the earlier form, consisted in the use of a concave or diverging lens located between the objective and the place where the image would otherwise be formed, the office of this diverging lens being to form, in conjunction with the objective, a virtual image of the distant object at a convenient distance for distinct vision in front of the eye. This type of telescope, known as the "Galilean," still survives in the familiar construction of opera-glasses, wherein the lens or system of lenses toward the object is called the "objective," although it does not form a real image. So, too, in a widely-used type of ocular the light after transmission through the objective is intercepted by a portion of the ocular, so that the real image is formed by the combined action of the objective and a portion of the ocular, which latter in such case is usually styled the "field-lens." The purpose of this detail is to make clear the true meaning of the term "objective" herein employed, said term being used to designate the system of lenses in a telescope nearest the object, and which constitutes the only essential part of a refracting-telescope.

By the close of the seventeenth century the earlier type of telescope had been carried to its practical limit. Opticians had found that if they desired to increase the power by increasing the size of their instruments it was necessary to increase the length in an inordinate ratio. Thus the astronomer Cassini made many brilliant astronomical discoveries with telescopes from thirty-five feet to one hundred and thirty-six feet in length, and a telescope made by Huygens, (still in the possession of the Royal Society of England,) which may doubtless be regarded as the masterpiece of the older opticians, had a length of one hundred and twenty-three feet and a diameter of only six inches. The reason for this forced great increase in length with moderate increase in power was not fully understood, but was attributed to the fact that a spherical surface of glass cannot refract to a single point all the rays of light originating in a distant point. This defect, which seemed to them inseparable from spherical refractory surfaces, is called "spherical aberration." We now know methods of diminishing or overcoming it completely; but, as the present invention does not relate thereto, such methods will not be further explained. Not until Sir Isaac Newton's discovery of the composite nature of light was the true explanation of the failure of all efforts to make short and powerful telescopes known. That philosopher showed that in any lens the distance from the lens to its image of a distant object is different for light of different wave-lengths, the shortest wave-length corresponding to the shortest focal length. Hence it follows that such a lens used as an objective of a telescope would exhibit colored borders about the image of every object emitting composite light. Only when the magnification of the ocular is very low—say two or three times at the most—does this chromatic phenomenon cease to be conspicuous. This error has received the name of "chromatic aberration," and Newton showed that it was many hundred times as serious as that of spherical aberration. Concluding from his experiments that the defect was insuperable, he invented a reflecting-telescope, which for more than a century remained unrivaled as an aid to astronomical discovery. For very nearly a century the dictum of Newton's remained unquestioned, when, by a chain of circumstances most interesting, but of which the detailed account would be too long, John Dolland, an English optician, was led between 1750 and 1760 to repeat Newton's experiments, but with very different results, for he found that it was possible to produce deviation of light without separation into prismatic colors by means of a prism of water combined with an opposing prism of glass. More than this, he found that the two varieties of glass then, as now, common in England—namely, crown or common window glass and flint glass, which latter is characterized by the presence of a greater or less amount of lead oxide—possessed very different powers in respect to dispersion. Thus, of two prisms (illustrated in Fig. 5) of these two varieties of glass which would deflect the light by the same angle, that made of flint glass would form a spectrum nearly twice as long as the other. Hence, if a prism of crown glass deflecting a transmitted beam of light, say, ten degrees were combined with one of flint glass which would deflect the beam of light five degrees in the opposite direction there would remain a deflection of five degrees without separation into prismatic colors. It also follows that a positive lens of crown glass combined with a negative lens of flint glass of about half the power would form images of distant objects without exhibiting prismatic colors whenever there are abrupt changes in brightness in the field. Such combinations of two different substances or materials are called "achromatic" systems. A common type of achromatic combinations is represented in Fig. 1, the negative lens B being of flint glass and the positive lens A of crown glass. By this highly ingenious invention or discovery, for which Dolland received a patent, the astronomical telescope has been reduced to a length of from twelve to eighteen times the diameter of the objective, instead of some two hundred times, as in the earlier form. This short account carries the history of the art of telescope-making down to the present day and represents, in brief, the present state of the art, and, although much more powerful telescopes have been made in the last half-century than any Dolland dreamed of, substantially the same principle of construction and means have been followed, and it is only because of the slow but steady improvement in the manufacture of glass of sufficient purity for optical purposes. Dolland could hardly procure anything good above four inches in diameter, whereas now it is possible to procure the material more than thirty-six inches in diameter. There still remained a defect in the objective as invented by Dolland, vastly less in degree, but much the same in kind as in the old telescopes—namely, a variation of the focal length in the objective with different wave-length of light, but following a very different law. To make clear the meaning of this statement, we may return to the consideration of the compound prism of flint and crown glasses illustrated in Fig. 5, wherein the flint-glass prism is lettered C and the crown-glass prism D.

Now, since the angle of the flint glass may be so chosen that the total length of the spectrum produced when sunlight passes through it is exactly the same as that of the reversed spectrum produced by the crown prism alone, it is possible to so arrange the combination that the longest and shortest light-waves are deviated exactly alike—that is, so the extreme red and violet shall have the same deviation; but it by no means follows that the intermediate wave-lengths—e. g., that corresponding to green light—will have the same deviation common to the red and violet. Indeed, in all combinations heretofore made the green would be deviated decidedly more than the extreme of the spectrum. It is this separation of white light by such a compound prism into a series of colors from green on one side to purple-violet, purple, or magenta on the other side which receives the name of "secondary dispersion," and a spectrum so formed is called a "secondary spectrum." There is obviously a corresponding phenomenon in the case of an achromatic combination of lenses, as illustrated in Fig. 1. For the best vision we have its shortest focus corresponding to light-waves which produce the color sensation of citron-yellow, all others having a longer focus. As result of this peculiarity of such a compound objective a bright object on a dark background—e. g., a star at night—appears surrounded by a corona of violet or purple-violet light, and a small dark object against a bright field—e. g., a twig of a tree against the bright sky—appears dyed with more or less brilliant violet or purple. Again, since the wave-lengths of light which produce the maximum physiological effect are much longer than those which produce a maximum effect upon a sensitive photographic plate, an objective corrected for visual purposes is practically worthless for photographic purposes, and vice versa.

As the result of much study and experimenting and by the application of an original method, which was described in an article published in the *American Journal of Science*, Vol. XXXVII, April, 1889, I have discovered that the defects hereinbefore referred to, and which give rise to the secondary spectrum common to achromatic and other combinations for the objectives of telescopes, can be entirely or in a very large measure eliminated or corrected by the employment, to form a compound objective, of lenses composed of certain specific materials and related to each other in a manner to yield refraction essentially without secondary dispersion.

I have discovered that a combination such as referred to may be made by the employment of potash-silicate crown glass with boro-silicate flint glass, and have practically demonstrated the efficiency of said combination.

It may be that the several types of glass or the materials for forming these new combinations may not at present be procurable in this country; but they are nevertheless commercial objects and readily obtainable, and, as the structural characteristics cannot so well be defined as can the articles themselves, I shall for convenience refer to the enumeration given by Messrs. Schott & Co., of Jena, Germany, in their published catalogue for 1886. The potash-silicate crown glass to which reference is made herein is designated in said catalogue "O 13," also by "current No. 14," and the boro-silicate flint glass is designated "O 161," also by "current No. 27."

It is of course to be understood that the types of glasses are to be wrought into the required forms, and that such forms are to be calculated and determined in the manner well understood by those skilled in the art by making achromatic objectives for telescopes.

I do not wish to be understood as limiting my invention to the employment of two lenses only in forming the objective, and I have illustrated in Figs. 1 to 4, inclusive, several of the various conventional forms, arrangements, and modifications which may be adopted, and in this connection it may be stated that no attempt has been made to illustrate or indicate accurately the required degrees of curvature.

Figure 2:
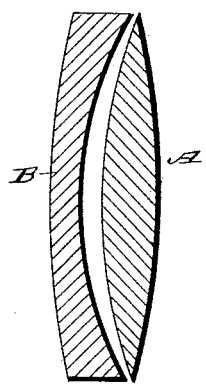
Figure 3:
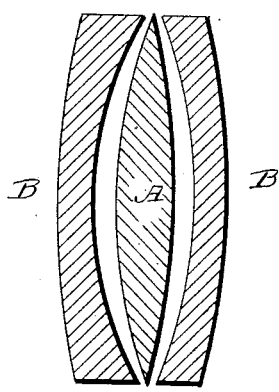
Figure 4:
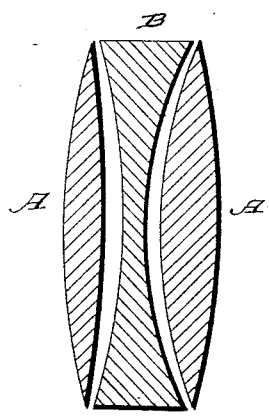
Figure 5:
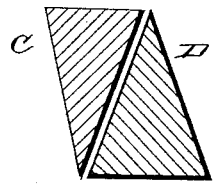

In further illustration of the invention it may be stated that the denser glass A may be placed first as in Fig. 1, or the less dense glass B may occupy the front, as in Fig. 2; or, if regarded as preferable, two lenses of one kind may be combined with one of the other, as indicated in Figs. 3 and 4, the only essential condition being that the curves are so chosen as to eliminate spherical aberration and at the same time secure the most satisfactory color correction for the purpose in view. Thus in the compound objective formed by a combination of boro-silicate flint glass and potash-silicate crown glass of the type indicated, the lenses designated B in the several figures may be made from the boro-silicate flint and the lenses A from potash-silicate crown.

I do not intend to imply that the glasses used in those combinations must be exactly of the character of the types which define them, but merely commercial approximates.

Having thus described my invention, what I claim as new is—

1. As a new manufacture, the hereinbefore-described improved objective for telescopes, the lenses whereof are composed of potash-silicate crown glass and boro-silicate flint glass, respectively.

2. The combination, to form a telescope-objective having the characteristics hereinbefore described, of a positive lens of potash-silicate crown glass and a negative lens of boro-silicate flint glass, as set forth.

CHARLES S. HASTINGS.

Witnesses:
 GEO. H. LARNED,
 C. T. DRISCOLL.